United States Patent
Kim et al.

(10) Patent No.: US 9,669,260 B2
(45) Date of Patent: Jun. 6, 2017

(54) APPARATUS AND METHOD FOR TRACKING THE POSITION OF EACH PART OF THE BODY FOR GOLF SWING ANALYSIS

(75) Inventors: Jin Wook Kim, Seoul (KR); Sung Kuk Chun, Goyang-si (KR); An Jin Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 222 days.

(21) Appl. No.: 14/352,951

(22) PCT Filed: Nov. 8, 2011

(86) PCT No.: PCT/KR2011/008467
§ 371 (c)(1),
(2), (4) Date: Apr. 18, 2014

(87) PCT Pub. No.: WO2013/058427
PCT Pub. Date: Apr. 25, 2013

(65) Prior Publication Data
US 2014/0254883 A1    Sep. 11, 2014

(30) Foreign Application Priority Data
Oct. 21, 2011  (KR) .......................... 10-2011-0108000

(51) Int. Cl.
*G06K 9/00* (2006.01)
*G06K 9/46* (2006.01)
(Continued)

(52) U.S. Cl.
CPC ...... *A63B 24/0021* (2013.01); *A63B 24/0006* (2013.01); *G06K 9/00342* (2013.01);
(Continued)

(58) Field of Classification Search
None
See application file for complete search history.

(56) References Cited

U.S. PATENT DOCUMENTS 7,728,839 B2    6/2010  Yang et al.
2007/0258648 A1*  11/2007  Perronnin .......... G06K 9/00281
                                        382/224
(Continued)

FOREIGN PATENT DOCUMENTS

JP    2001-202379 A    7/2001
JP    2006-171929 A    6/2006
(Continued)

OTHER PUBLICATIONS

International Search Report issued Oct. 30, 2012 in corresponding International Patent Application No. PCT/KR2011/008467 (5 pages, in Korean with English Translation).

*Primary Examiner* — Sean Conner
(74) *Attorney, Agent, or Firm* — NSIP Law

(57) ABSTRACT

A position tracking apparatus includes: a depth image obtaining unit for obtaining a depth image; a database created by collecting depth images received from the depth image obtaining unit; a feature extracting unit for extracting features from each pixel of the depth image; a classifier training unit for training a classifier in order to determine the position of the parts of the body by receiving a feature set for each part of the body as inputs which are extracted by using the feature extracting unit from all of the depth images in the database; and a position determination unit for extracting features for each pixel of the depth image received by the depth image obtaining unit using the feature extracting unit in a state in which the classifier training unit trains the classifier, and for tracking the three-dimensional position of each part of the body through the classifier.

6 Claims, 9 Drawing Sheets

(51) Int. Cl.
*A63B 24/00* (2006.01)
*G06K 9/62* (2006.01)
*G06K 9/66* (2006.01)
*G06T 7/246* (2017.01)

(52) U.S. Cl.
CPC ......... *G06K 9/6267* (2013.01); *G06K 9/6282* (2013.01); *G06K 9/66* (2013.01); *G06T 7/246* (2017.01); *A63B 2024/0056* (2013.01); *G06T 2207/10028* (2013.01); *G06T 2207/20081* (2013.01); *G06T 2207/30221* (2013.01)

(56) References Cited

U.S. PATENT DOCUMENTS

| | | | |
|---|---|---|---|
| 2009/0196492 A1 | 8/2009 | Jung et al. | |
| 2010/0034457 A1 | 2/2010 | Berliner et al. | |
| 2010/0135581 A1* | 6/2010 | Baik | G06T 7/0065 382/195 |
| 2010/0160835 A1 | 6/2010 | Shin et al. | |
| 2010/0194679 A1 | 8/2010 | Wu et al. | |
| 2011/0013807 A1 | 1/2011 | Lee et al. | |
| 2011/0026808 A1* | 2/2011 | Kim | G06T 7/50 382/154 |
| 2011/0135204 A1 | 6/2011 | Choi | |
| 2012/0099782 A1* | 4/2012 | Rhee | G06K 9/4671 382/154 |
| 2012/0219209 A1* | 8/2012 | Shotton | G06K 9/00335 382/159 |

FOREIGN PATENT DOCUMENTS

| | | |
|---|---|---|
| JP | 2006-185166 A | 7/2006 |
| JP | 2006-527443 A | 11/2006 |
| KR | 10-2010-0075356 A | 7/2010 |
| KR | 10-0976141 B1 | 8/2010 |
| KR | 10-2011-0007806 A | 1/2011 |

\* cited by examiner

PROBABILITY DISTRIBUTION   HEAD PROBABILITY   HANDS PROBABILITY

APPARATUS AND METHOD FOR TRACKING THE POSITION OF EACH PART OF THE BODY FOR GOLF SWING ANALYSIS

CROSS-REFERENCE TO RELATED APPLICATIONS

This application is a National Stage of International Application No. PCT/KR2011/008467, filed Nov. 8, 2011 and published as WO2013/058427 on Apr. 25, 2013, which claims the benefit of Korean Patent Application No. 10-2011-0108000, filed on Oct. 21, 2011, the entire disclosures of which are incorporated herein by reference for all purposes.

TECHNICAL FIELD

The present disclosure relates to an apparatus and a method for tracking the position of each body part of a person who is making golf swing.

BACKGROUND ART

Golf is one of most rapidly growing sports in the world, and relevant industries such as indoor driving ranges, screen golf clubs and golf games are in increasing demand. Despite of development of relevant industries represented by golf sports and content infrastructures, it is not easy to improve golf skill. This is not caused by personal physical differences such as heights or weights as in basketball or soccer but caused by complicated golf swing mechanism composed of fixing of eyes, shift of center of gravity, swing trajectory or the like.

In order to improve the swing mechanism, golf players repeatedly practice their golf swing by themselves or adjust their golf swing with the assistance of a professional coach. However, even though a golf player practices golf swing by himself, he cannot easily recognize points to improve. In addition, the adjustment with the assistance of a coach may not be easily associated with feeling or mechanism of actual swing, and the appropriate swing mechanism may not be maintained after the correction. Thus, the swing of the golf player may return to his original swing. To overcome this problem, there is a demand for a system for automatically analyzing golf swing of a user and suitably feeding digitized and visualized information back to the user.

In order to realize an automatic system for analyzing golf swings, there are various methodologies proposed for tracking the motion of a specific body part at successively input swings of a user. The methods being studied for tracking a body part in the art may be classified into a marker-based method and a marker-less method, depending on the presence of a marker.

In the marker-based method, a marker is attached to a part of a human body to be tracked and the motion of the marker during swing is detected and analyzed. Meanwhile, in the marker-less method, a single camera or a plurality of cameras are installed and the part of the human body is tracked by analyzing images received from the cameras.

An existing marker-based tracking method which tracks a body part by analyzing golf swing may sense the motion of the body part in a three-dimensional space by tracking a marker attached to the body of a user. However, this method needs installation of an expensive instrument for tracking the marker and may cause discomforts to the user during his/her swing due to the attached marker.

Recently, in order to overcome the drawbacks of the marker-based system, a marker-less method for tracking a body part by receiving and analyzing swing of a user through a single camera or a plurality of cameras without attaching a marker is attracting attention. This system may use image data or depth data, depending on the type of the camera used.

In the marker-less method, a system which receives swing of a user through an image camera is attracting great attention since image cameras recently become popular and thus various smart phone applications in relation to golf swing have appeared. However, there is limitation in tracking a body part moving in a three-dimensional space by using two-dimensional image data (for example, when various body parts overlaps each other), and the result of tracking the body part is unstable due to noise or sensitiveness to brightness of light.

In order to overcome the drawbacks of the image camera-based system, a body part tracking method using a depth camera is on the rise. The depth camera outputs an image including distance information to a pixel, namely three-dimensional information of x-, y- and z-axes. Differently from color or brightness information of an image camera, the depth camera gives intuitive information for a structure of an object in the image and outputs stable data not sensitive to the brightness.

Studies and methods in relation to depth camera-based body part tracking for analyzing golf swing have not been proposed. However, methods for tracking a general motion are actively being studied. Representatively, there are XBOX 360 Kinect Project of Microsoft and OpenNI of Prime Sense. Kinect of Microsoft is a probabilistic model-based system and trains a classifier with features of a body part to be tracked. If an unknown depth image is input, Kinect calculates probability of each pixel of the image through the classifier to estimate the body part. OpenNI of Prime Sense tracks a body part by structurally analyzing a person present in an input depth image. The above studies show stable results of body part tracking in comparison to existing studies for general motions, but they are not suitable for special motions such as golf swing analysis. For example, hands during golf swing at address may not be accurately tracked, and if the head moves close to the hands during back swing, the head and the hands may be confused.

U.S. Patent Publication No. 2010/0034457 A1 discloses a method for identifying the trunk, the head and the limbs of a person by using a depth image, which however may provide unstable identification results since the trunk, the head and the limbs are distinguished using certain proportions.

DETAILED DESCRIPTION OF THE INVENTION

Technical Problem

The present disclosure is directed to providing an apparatus and method for tracking a position of each body part to analyze golf swing, which may train a classifier by extracting a local histogram to classify body parts in a depth image and determine the position of each specific body part when a new depth image is input through the trained classifier.

Technical Solution

In one aspect of the present disclosure, an apparatus for tracking a position, which includes: a depth image obtaining unit configured to obtain a depth image, a feature extracting unit configured to receive the depth image from the depth image obtaining unit and extract features for each pixel from the received depth image to generate a feature set for each part of a human body, a classifier training unit configured to train a classifier, which distinguishes a position of each part of the human body, by using the feature set generated in the feature extracting unit, and a position determining unit configured to extract features of each pixel from the depth image received at the depth image obtaining unit in a state in which the classifier is trained by the classifier training unit, distinguish a body part of each pixel through the trained classifier, and track three-dimensional position information of each body part, is provided.

Here, the feature extracting unit and the position determining module extract patterns based on distance information from each pixel to other pixels around the corresponding pixel of the depth image, generate a pattern dictionary by grouping the patterns according to a predefined first similarity criterion, and apply each pattern word of the pattern dictionary to each pixel of the depth image according to a predefined second similarity criterion to generate the feature set for each body part.

The classifier training unit may use a randomized forests algorithm.

In an aspect of the present disclosure, a method for tracking a position, which includes: obtaining a depth image from a depth image obtaining unit, generating, by a characteristic extracting unit, a feature set for each body part by extracting features for each pixel of the obtained depth image, training, by a classifier training unit, a classifier which distinguishes a position of each body part by using the generated feature set for each body part, extracting features of each pixel of the depth image received from the depth image obtaining unit by using the feature extracting unit in a state in which the classifier is trained by the classifier training unit, and tracking, by a position determining module, three-dimensional position information of each body part by the trained classifier and the extracted features of each pixel of the depth image, is provided.

The generating of the feature set for each body part by using the feature extracting unit includes: extracting patterns based on distance information from each pixel to other pixels around the corresponding pixel of the depth image, generating a pattern dictionary by grouping the patterns according to a predefined first similarity criterion, applying each pattern word of the pattern dictionary to each pixel of the depth image according to a predefined second similarity criterion, extracting a feature for each pixel by calculating frequencies of pattern words applied to pixels around each pixel of the depth image, and generating a feature set for each body part by collecting the extracted features of each body part.

In addition, the training of the classifier may be performed using a randomized forests algorithm.

Advantageous Effects

The apparatus and method for tracking a position of each body part for golf swing analysis according to the present disclosure may detect positions of the head and the hands during golf swing by using a popular depth camera without using an expensive instrument, differently from an existing marker-based system, and may also detect the positions of the head and the hands during golf swing in a three-dimensional space by using the depth camera, differently from an existing marker-less system using an image camera.

The apparatus and method of the present disclosure may be utilized to a system for analyzing and adjusting golf swing, which is recently being on the rise.

MODE FOR THE INVENTION

Hereinafter, the present disclosure will be described in detail with reference to the accompanied drawings. However, the accompanied drawings and the following description are just embodiments of an apparatus and a method for tracking a position according to the present disclosure, and the technical spirit of the present disclosure is not limited thereto.

Figure 1:
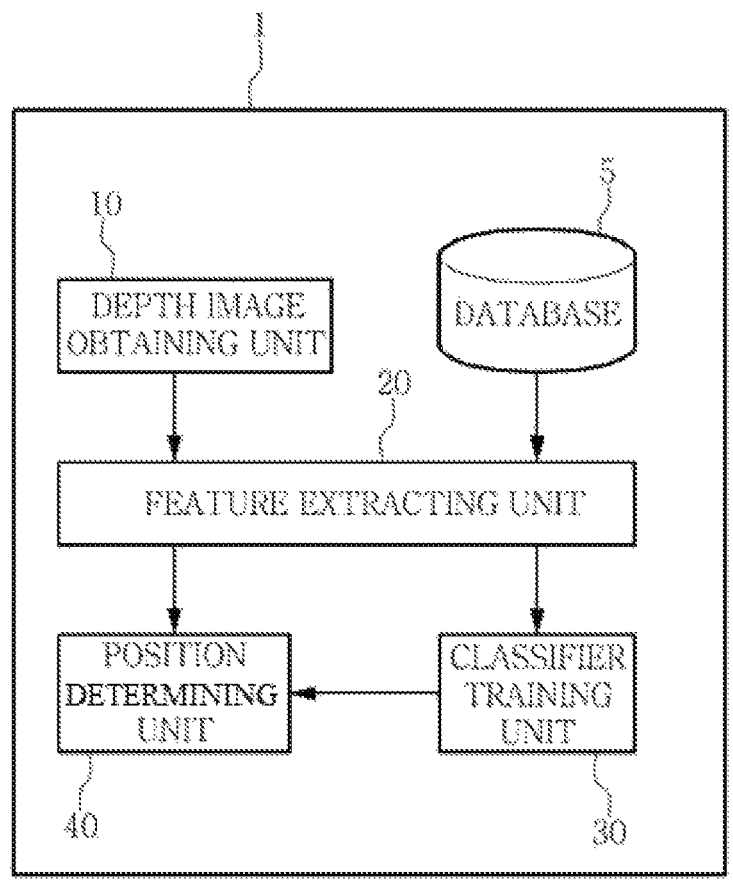
FIG. 1 is a schematic diagram showing an apparatus for tracking a position according to an embodiment of the present disclosure.

FIG. 1 is a schematic diagram showing an apparatus for tracking a position according to an embodiment of the present disclosure.

Referring to FIG. 1, an apparatus 1 for tracking a position (hereinafter, also referred to as a position tracking apparatus 1) according to an embodiment of the present disclosure includes a depth image obtaining unit 10, a database 5, a feature extracting unit 20, a classifier training unit 30 and a position determining unit 40.

The depth image obtaining unit 10 plays a role of obtaining a depth image and may use a depth camera or the like. In other words, the depth image obtaining unit 10 obtains a golf motion image showing golf swing of a person and obtains a depth image including distance information of each pixel from the camera by means of ultrasonic wave or the like.

The database 5 stores the depth image received from the depth image obtaining unit 10 and a set of information in relation to corresponding position information of the head and the hands of a person swinging a golf club.

The feature extracting unit 20 plays a role of extracting features from the depth image stored in the database 5 and the pixel of the depth image obtaining unit 10. The feature extracting unit 20 may operate differently according to the system flow for transmitting the feature set extracted from the depth image input from the depth image obtaining unit 10 and the database 5 respectively to the classifier training unit 30 and the position determining unit 40. Therefore, hereinafter, the feature extracting unit 20 for receiving a depth image from the database 5 and transmitting features to the classifier training unit 30 is also called a 'training feature extracting unit', and the feature extracting unit 20 for receiving a depth image from the depth image obtaining unit 10 and transmitting features to the position determining unit 40 may also called a 'test feature extracting unit'.

The classifier training unit 30 plays a role of training a classifier, which distinguishes a body part corresponding to each pixel of the depth image, by using the feature set extracted from the depth image stored in the database 5.

The position determining unit 40 distinguishes a body part corresponding to each pixel of the depth image received using the features extracted by the feature extracting unit 20 from the depth image received in the depth image obtaining unit 10 and by the classifier trained by the classifier training unit 30 and determines a three-dimensional position of the body part based thereon.

Figure 2:
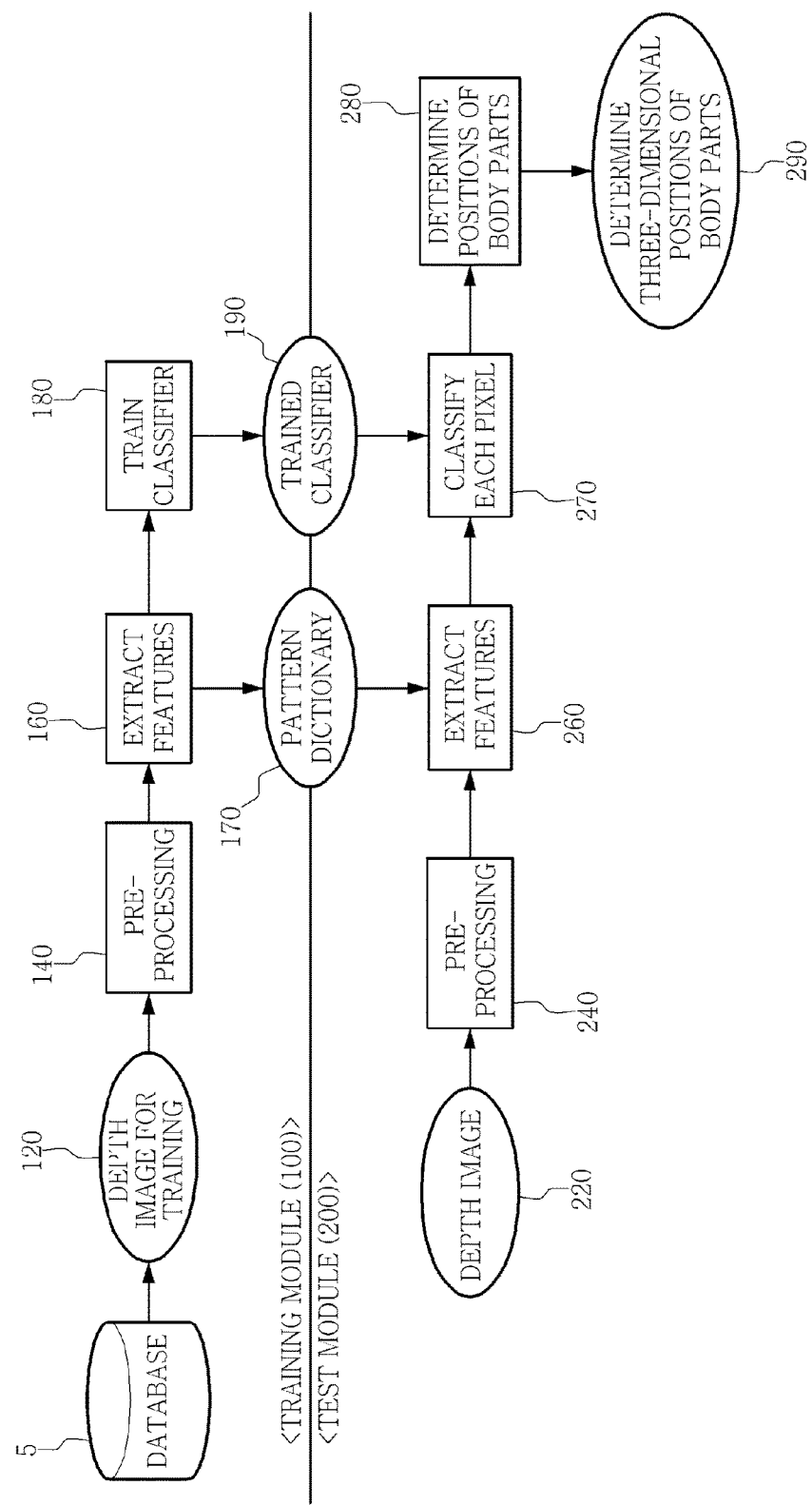
FIG. 2 is a flowchart for illustrating operations of a training module and a test module employed in an apparatus for tracking a position according to the present disclosure.

FIG. 2 is a flowchart for illustrating operations of a training module 100 and a test module 200, employed in the apparatus for tracking a position according to the present disclosure.

The position tracking apparatus 1 of the present disclosure is directed to tracking positions of the heads and the hand of a user in a depth image obtained from a single depth camera and containing information about golf swing. If the position tracking apparatus is applied to other kinds of sports instead of golf, it may also be used for tracking the position of another body part such as feet.

The position tracking apparatus 1 of the present disclosure includes a training module 100 for extracting features from the training depth image from the prepared database 5 by means of the feature extracting unit 20 and for inputting the extracted feature set to the classifier training unit 30 to train the classifier for classifying a head and hands, and a test module 200 for calculating three-dimensional positions of the head and the hands in the position determining unit 40 by using the features extracted by the feature extracting unit 20 from the depth image received from the depth image obtaining unit 10 and the classifier trained by the training module.

As shown in FIG. 2, the training depth image 120 serving as a sample is received from the prepared database 5, a pre-processing unit (not shown) performs pre-processing thereto 140, thereby features for each pixel are extracted 160. For extracting the features, a pattern for a depth value of each pixel is extracted first 160, such patterns are clustered to generate a pattern dictionary 170, and then a pattern word included in the pattern dictionary is allocated to each pixel according to a predefined similarity criterion. The extraction of the features is measured by calculating the frequencies of pattern words allocated to regions around the pixels corresponding to the person making golf swing. Here, the 'pattern word' means a representative value of each pattern set and has a concept representing the shape of the regions around the pixels obtained from the body of the person making the golf swing. The detail will be described later. In addition, the classifier training unit 30 trains the classifier 180 by using feature sets extracted from all depth images of the database 5.

Meanwhile, the test module 200 receives a depth image 220 newly input to the depth image obtaining unit 10, performs pre-processing thereto 240, and extracts a feature from each pixel of the pre-processed depth image 260. If the feature is extracted, a corresponding body part of each pixel is distinguished using the classifier 270, and two-dimensional positions of the head and the hands of a person making golf swing are determined based on the distinguished body part of each pixel 280. After the two-dimensional positions of the head and the hands are determined, these positions are matched with the depth image to finally determine three-dimensional spatial coordinates of the head and the hands 290.

Figure 3A:
FIGS. 3A and 3B show an input data image and an output data image of a test module, respectively.
Figure 3B:
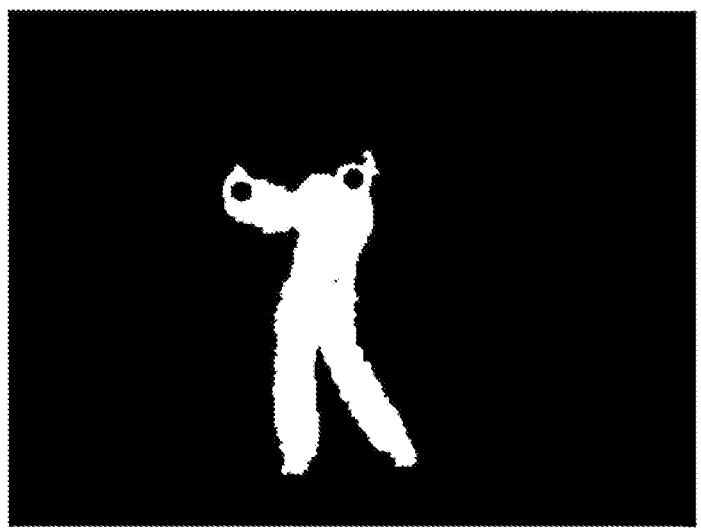

FIGS. 3A and 3B show an input data image and an output data image of the test module 200, respectively.

FIG. 3A shows a depth image input to the test module 200. Both a person making golf swing and a background image are shown. FIG. 3B is data finally output by the test module 200, from which the background image is removed, and the detected positions of the head and the hands of a person are respectively marked with circles. Hereinafter, a method for performing the above process will be described in detail.

Figure 4:
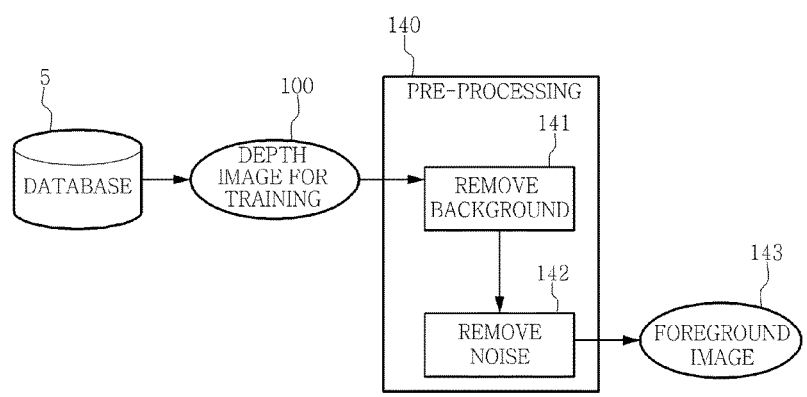
FIG. 4 is a flowchart for illustrating a pre-processing operation of a training module in detail.

FIG. 4 is a flowchart for illustrating a pre-processing operation of the training module in detail.

Figure 5:
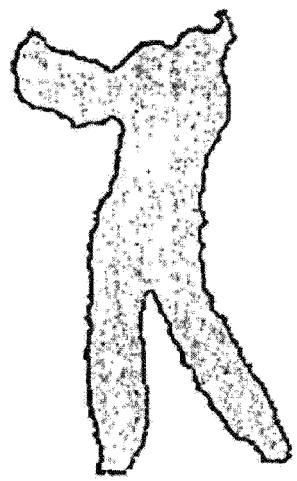
FIG. 5 shows a foreground image obtained after the pre-processing operation by a training module.

If the training depth image 120 is input, the pre-processing unit removes the background image, which is not necessary, as well as basic image processing 141, and removes noise 142. By doing so, background image is removed and a foreground image 143 in which only a human image remains is obtained. FIG. 5 shows an example of the obtained foreground image 143.

Figure 6:
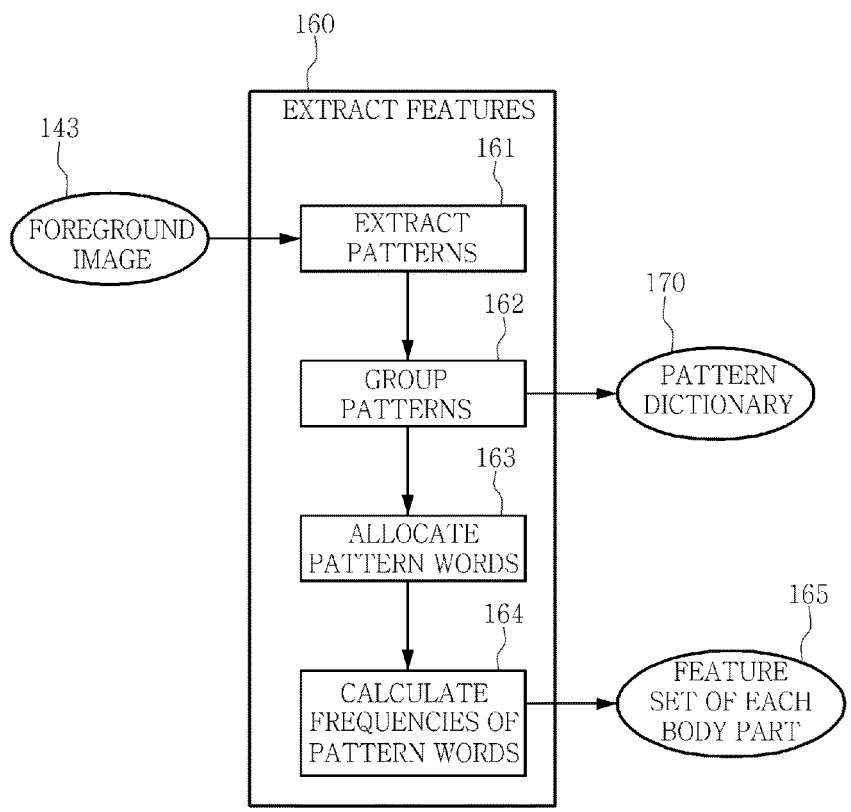
FIG. 6 is a flowchart for illustrating a feature extracting operation of a training module in detail.

FIG. 6 is a flowchart for illustrating an extracting operation of a feature histogram in the training module in detail.

After all foreground images 143 of the database 5 are obtained, features are extracted from the pixels corresponding to the foreground image 160. In order to extract features in the training module 100, first, patterns are extracted using the difference in depth information between foreground pixels of all foreground images stored in the database 5 and surrounding pixels 161, then the extracted patterns are clustered 162, and a pattern dictionary 170 having a representative value of each set as a pattern word is generated. Pattern words are allocated to pixels of all depth images of the database 5 according to a predefined similarity criterion 163, a histogram is calculated based on the frequencies of the pattern words in regions around each pixel to extract features 164, and features extracted from the pixels corresponding to each body part are collected to generate a feature set of each body part 165. Here, information about the pixel corresponding to each body part is predefined when the database 5 is generated.

Figure 7:
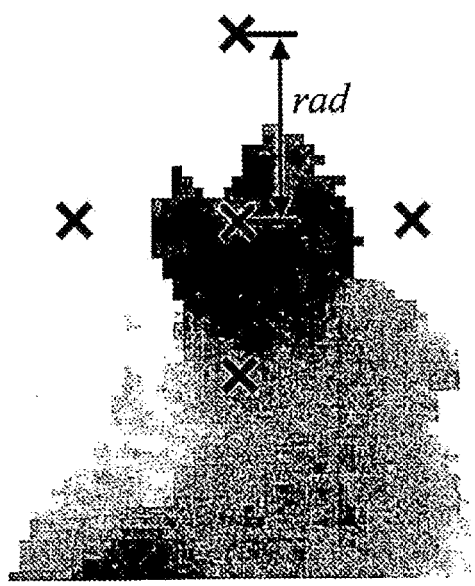
FIG. 7 shows an example of a pattern extracted in FIG. 6.

FIG. 7 shows an example of a local feature vector of FIG. 6.

The pattern is extracted by storing a difference in depth information between any pixel of the depth image and surrounding pixels as a vector. FIG. 7 shows an example of extraction of a local feature vector in which the feature vector is extracted based on a central mark, and a four-dimensional vector is extracted using a difference in depth information between four pixels located at a 15-pixel distance in a radial direction and a reference pixel.

A method for extracting a pattern vector f will be described below in detail. A feature vector f at a certain pixel located at a coordinate (x,y) in the depth image is represented as follows.

$$f_i(x, y) = d(x, y) - d(\text{offset}_i(x, y)), \quad 0 \leq i < \dim s \quad \text{Equation 1}$$

In Equation 1, d (x,y) represents a depth value of a pixel corresponding to the coordinate (x,y) in the depth image, and dim s represents a degree of a feature vector to be extracted. Offset$_i$ (x,y) representing a coordinate in an image is defined as follows.

$$\text{offset}_i(x, y) = (x + \sin\theta_i \times \text{rad}, y + \cos\theta_i \times \text{rad}), \quad \text{Equation 2}$$
$$\theta_i = \text{radian}\left(\frac{360}{\dim s} \times i\right)$$

In Equation 2, rad is a variable representing a distance from a pixel located at the coordinate (x,y) to a surrounding pixel, which is in reverse proportion to a size of the center of gravity of a foreground image depending on the distance to the depth camera. Therefore, if the distance from the foreground to the depth camera increases, rad decreases. If the distance from the foreground to the depth camera decreases, rad increases.

After a pattern vector is extracted from all foreground pixels of the depth image stored in the database 5, features are extracted therefrom as described below in detail.

Pattern vector sets extracted from the depth image are clustered to generate a pattern dictionary. The pattern vector sets are clustered by means of a clustering algorithm such as a K-means clustering algorithm. If the clustering process is completed, a pattern dictionary having a representative value of each cluster as a pattern word is generated, and a pattern vector extracted from each pixel of the depth image is compared with pattern words of the pattern dictionary to allocate the most similar pattern word to the corresponding pixel.

Figure 8:
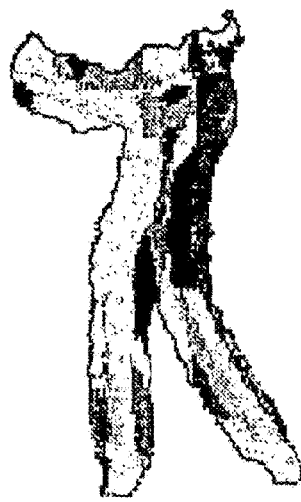
FIG. 8 shows an image in which a pattern word is allocated to each pixel of the depth image of FIG. 6.

A sample image in which a pattern word of the pattern dictionary is allocated to each pixel of the depth image as described above is depicted in FIG. 8. It may be found that similar pattern words are distributed with the same shade.

In an image to which the pattern words are allocated, features are extracted by calculating a histogram based on the frequency of the pattern word allocated to a certain pixel and surrounding pixels. Since positions of pixels corresponding to the hands, the head and other body parts are already known, the final output data correspond to feature sets 165 of the hands, the head and other body parts extracted from the depth image stored in the database.

Figure 9:
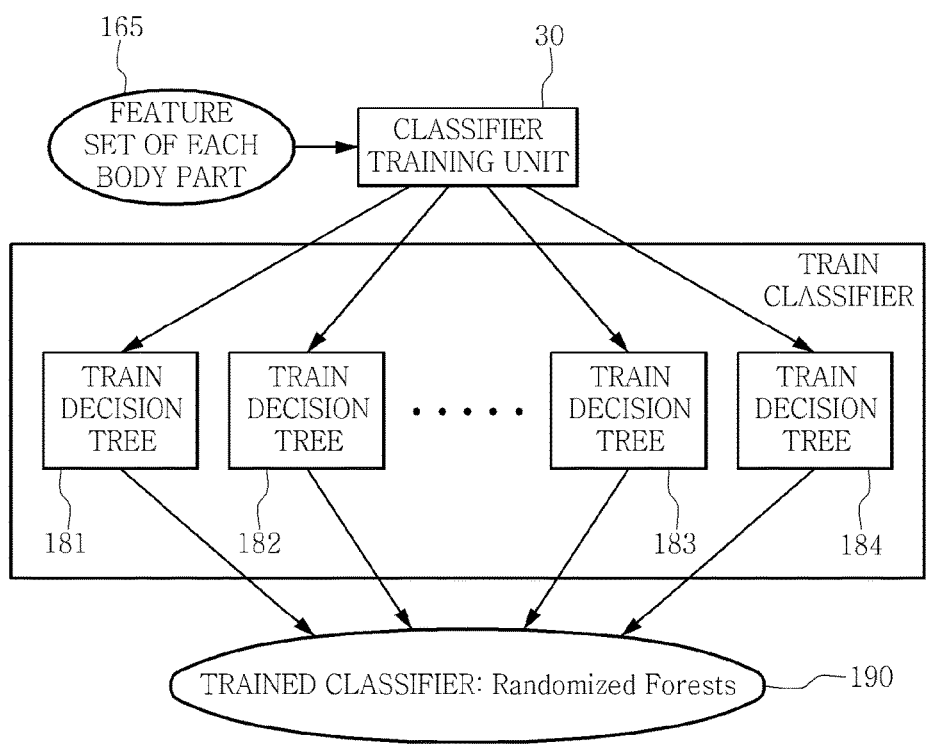
FIG. 9 is a flowchart for illustrating a classifier training operation of a training module in detail.

After the feature sets 165 of the hands, the head and the other body parts are obtained in the feature extracting step, a classifier is trained based thereon. FIG. 9 is a flowchart for illustrating a classifier training operation of the training module 100 in detail.

The classifier training unit 30 receives the obtained feature sets 165 of each body part as an input and trains each of a plurality of decision trees 181, 182, 183, 184 to generate a trained classifier 190. Here, the classifier may be trained using a randomized forests algorithm and may also be configured as an ensemble of single trained decision trees.

Figure 10:
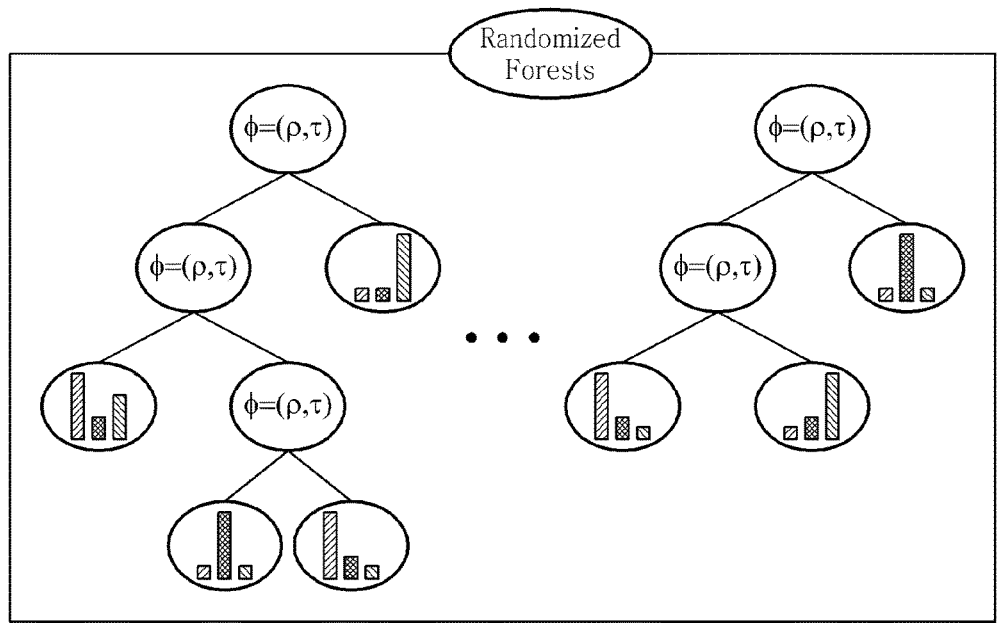
FIG. 10 is a diagram showing an example of randomized forests of a classifier trained by a training module.

FIG. 10 is a diagram showing a randomized forests algorithm applied to the training module.

The classifier is trained by training each decision tree of the randomized forests. Here, the input is a feature set sampled at random (sampled with the same number in a feature set of each body part), and the output is a tree in which a terminal node has probability of each body part. Here, since the body part is to be distinguished using the classifier trained through the training operation, hereinafter, the body part may also be called a 'class'. In addition, since the extracted features have a property of a histogram based on the frequency number, the features may also be called a 'histograms'.

A method for training a decision tree will be described in detail. When a sample set is input to a node, a branch condition of the node for allowing sample sets to be easily classified for each body part, namely allowing samples of the same property to be shifted to a subordinate node is found, and the sample sets classified according to the branch condition are allocated to right and left subordinate nodes, respectively. When branching, each node stores a branch condition, and a final terminal node stores probability of each class.

A method for determining a branch condition $\Phi$ of a sample set S allocated to a node T is as follows.

When the sample set S is defined as S={(hist,i) |hist=histogram based on a frequency of a pattern word, i={the head, the hands, the other body parts}} and the branch condition $\Phi$ is defined as $\Phi = (\rho, \tau)$, $\rho$: a class of a histogram with the greatest discernment, $\tau$: a threshold value), a class $\rho$ having the greatest discernment is selected from classes of the histogram by using a Fisher's discriminant criterion. $\rho$ is expressed as follows.

$$\rho = \text{argmax}_j \frac{V_j}{\sum_i V_{ij}/(P \times Q)} \quad \text{Equation 3}$$

$V_j$: dispersion of a $j^{th}$ class in all sample histogram sets
$V_{ij}$: dispersion of the $j^{th}$ class in a histogram of an $i^{th}$ class
P: the number of all sample histograms
Q: the number of histograms in the $i^{th}$ class.

Next, $\tau'$ representing a value of j $q^{th}$ class of the histogram for classifying the sample set S into a subset with high homogeneity is found and each subset is transferred to a subordinate node. A condition for determining $\tau'$ is as follows.

$$\tau' = \text{arg max}_\tau \Delta im(S|\tau) \quad \text{Equation 4}$$

In Equation 4, $\Delta$im (S|$\tau$) represents the decrement of impurity of the classified sample set S and is defined as follows.

$$\Delta im(S|\tau) = im(S) - \frac{|S_1(\tau)|}{|S|} im(S_1(\tau)) - \frac{|S_\tau(\tau)|}{|S|}(S_\tau(\tau)) \quad \text{Equation 5}$$

In Equation 5, im (S) represents misclassification impurity of the sample set S, and |S| is the size of the sample set S. Im (S) is defined as follows.

$$im(S) = 1 - \max_i P(w_i|S) \quad \text{Equation 6}$$

In Equation 6, P ($w_i$|S) represents probability of the $i^{th}$ class in the sample set S and is calculated as follows.

$$P(w_i|S) = \frac{\text{number of samples belonging to class } i \text{ in } s}{|S|} \quad \text{Equation 7}$$

In addition, $S_l(\tau)$ and $S_r(\tau)$ of Equation 5 respectively represent subsets of the sample set S classified by $\tau$ and transferred to left and right subordinate nodes and are defined as follows.

$$S_l(\Phi) = (hist, i) \mid hist(j) < \tau, hist(j)$$
$$= \text{frequency of } j^{th} \text{ class in } hist$$

Equation 8

$$S_\tau(\Phi) = \frac{S}{S_l(\Phi)}$$

Equation 9

The branch condition ($\Phi=(\rho,\tau)$) of the node T determined by the above equations is stored, and the same work is recursively performed for branched subordinate nodes.

Figure 11:
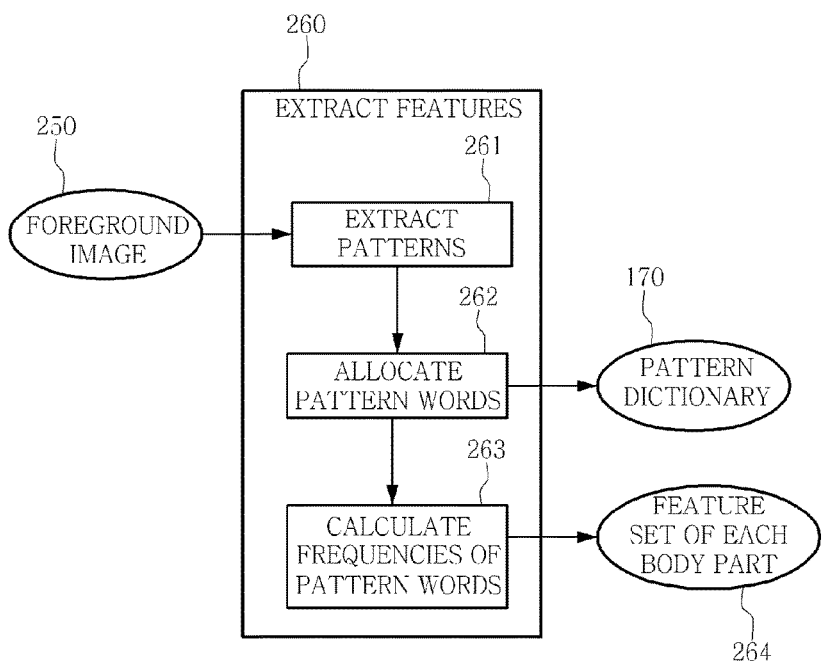
FIG. 11 is a flowchart for illustrating a feature extracting operation of a test module in detail.

FIG. 11 is a flowchart for illustrating a pre-processing operation and a feature histogram extracting operation of the test module in detail.

If the foreground image 250 in which a background is removed and only a human image is included is obtained, the test module 200 extracts features 260. In order to extract the test features, patterns are extracted 261 from each foreground pixel of the foreground image 250, the extracted patterns are compared with the pattern words of the pattern dictionary 170 generated in the training module 100 to allocate a similar pattern word to the corresponding pixel 262, and a histogram based on the frequencies of the pattern words allocated to surrounding regions of each pixel are calculated 263 to extract the features 264.

Figure 12:
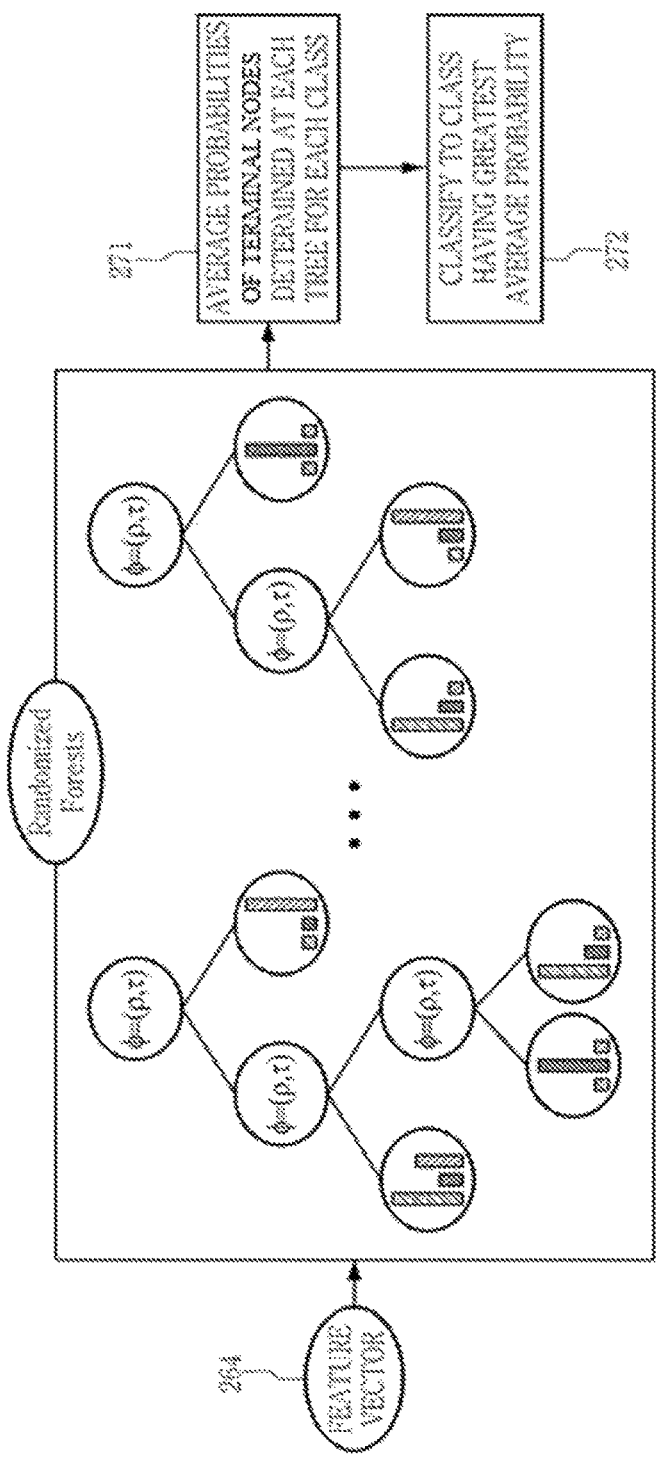
FIG. 12 is a flowchart for illustrating a method for a test module to determine for each pixel whether the corresponding pixel represents the head, the hand or another body part of a person.

FIG. 12 is a flowchart for illustrating a method for the test module 200 to determine the positions of the head and the hands of a person.

If the feature 264 for a pixel is extracted, a pixel classifying unit (not shown) uses the feature 264 as an input and provides probability of each class and pixel classification results as outputs. In detail, the pixel classifying unit inputs the feature to each decision tree of the classifier 19 trained by the training module 100, obtains probability of each class of a terminal node reached by moving according to a determining condition of a node in the tree, averages probabilities obtained from the trees for each class 271, and classifies a certain pixel to a class showing the greatest probability value 272.

If probability distribution of each class for the input depth image is obtained, three-dimensional positions of body parts such as the head and the hands are determined. In detail, the test module 200 determines a position of each body part using a Meanshift algorithm. The Meanshift algorithm is an algorithm for efficiently finding a mode in a given probability distribution and needs the setting of an initial position. Therefore, a position of a pixel having a greatest probability for each class is designated as an initial value. Three-dimensional spatial position information of the head, the hands or the like is obtained through the determined mode of each class and the depth information of the mode.

Figure 13:
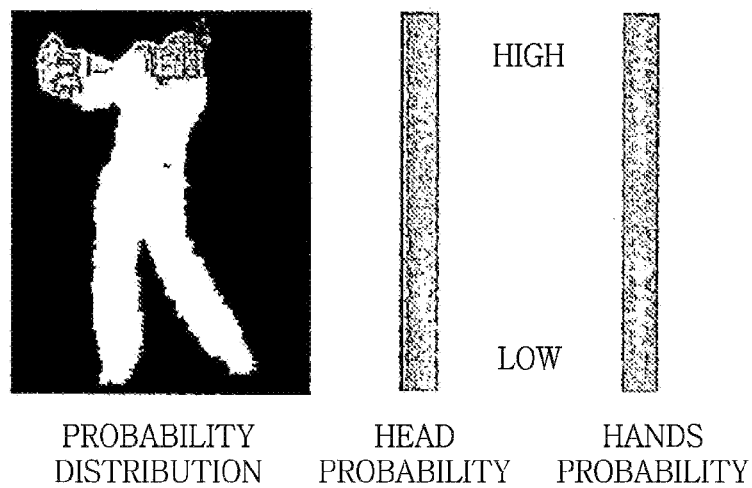
FIG. 13 is an image showing probability distribution of each body part with respect to a depth image input to a test module.
Figure 14:
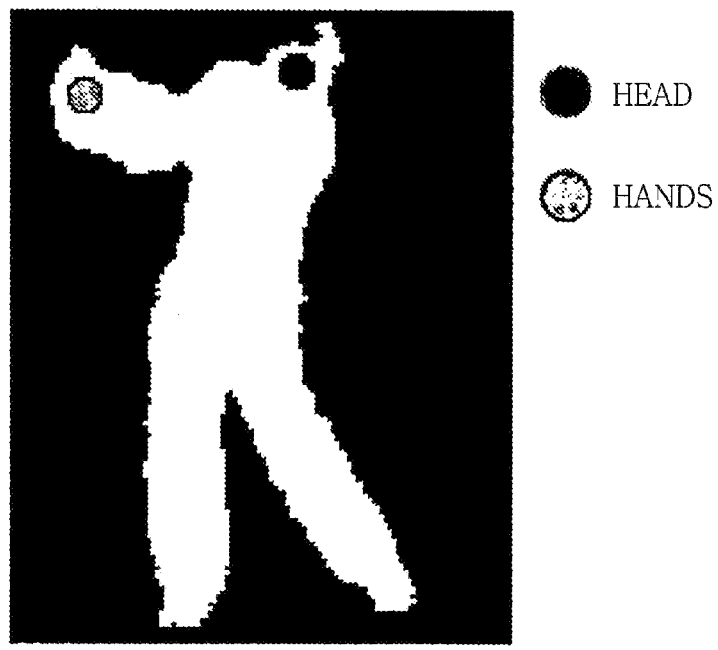
FIG. 14 is an image showing positions of the head and the hands of a person in a space, output from a test module.

FIG. 13 is an image showing probability distribution of each class for a depth image input to the test module 200, and FIG. 14 is an image showing positions of the head and the hands of a person in a space, output from the test module 200.

As shown in FIG. 13, it may be found from the probability distribution image that the head part has dark shade and the hand part has dark shade, and head probability and hand probability are depicted corresponding thereto. By using this, positions of the head and hands of a person may be determined as shown in FIG. 14.

The present disclosure may track positions of the head and the hands by performing the above process in each frame when successive golf swing depth images are input.

The invention claimed is:

1. An apparatus for tracking positions of parts of an object, the apparatus comprising:
  a feature extracting processor configured to:
    receive a training depth image comprising pixels and depth information of each of the pixels,
    extract a foreground depth image of an object comprising parts from the training depth image, the foreground depth image of the object comprising some of the pixels of the training depth image and corresponding depth information,
    extract patterns by storing differences between the depth information of each pixel of the foreground depth image of the object and the depth information of pixels surrounding the each pixel of the foreground depth image of the object as a vector, each of the surrounding pixels being in either the foreground depth image of the object or a portion of the training depth image outside the foreground depth image of the object, and each of the surrounding pixels being located at a predetermined distance in a radial direction from the each pixel, said predetermined distance being greater than 1 pixel,
    extract features for each pixel of the foreground depth image of the object by calculating a histogram based on a frequency of the extracted patterns, and
    generate a feature set for each of the parts of the object based on the extracted features;
  a classifier training processor configured to train a classifier to distinguish which of the parts of the object each pixel of the foreground depth image of the object belongs to using the feature set; and
  a position determining processor configured to identify a part of an input image object of an input depth image to which each pixel of the input image object corresponds using the trained classifier and features extracted from the input depth image, and determine three-dimensional position information of each part of the input image object.

2. The apparatus for tracking the position according to claim 1, wherein the feature extracting processor is further configured to:
  generate a pattern dictionary by clustering the patterns according to a predefined first similarity criterion, and
  apply each pattern word of the pattern dictionary to each pixel of the foreground depth image of the object according to a predefined second similarity criterion to generate the feature set for each part of the parts of the object.

3. The apparatus for tracking the position according to claim 1, wherein the classifier training processor is further configured to use a randomized forests algorithm.

4. A method for tracking positions of parts of an object, comprising controlling a processor to:
  obtain a training depth image;
  extract a foreground depth image of an object comprising parts from the training depth image, the foreground depth image of the object comprising some of the pixels of the training depth image and corresponding depth information,
  extract patterns by storing differences between the depth information of each pixel of the foreground depth image of the object and the depth information of pixels surrounding the each pixel of the foreground depth image of the object as a vector, each of the surrounding pixels being in either the foreground depth image of the object or a portion of the training depth image outside the foreground depth image of the object, and each of the surrounding pixels being located at a predetermined distance in a radial direction from the each pixel, said predetermined distance being greater than 1 pixel;

generate a database including information about a part of the object corresponding to each pixel from the foreground depth image of the object;

extract features for each pixel of the foreground depth image of the object by calculating a histogram based on a frequency of the extracted patterns;

generate a feature set for each of the parts of the of the object based on the extracted features;

train a classifier to distinguish a position of each part of the object in the foreground depth image of the object by using the generated feature set for each part of the foreground depth image of the object;

extract features of each pixel of an input image object of an input depth image in a state in which the classifier is trained; and track three-dimensional position information of each part of the input image object in the input depth image using the trained classifier and the extracted features of each pixel of the input image object.

5. The method for tracking the position according to claim 4, wherein the generating of the feature set for each part of the foreground depth image of the object includes:

generating a pattern dictionary by clustering the patterns according to a predefined first similarity criterion;

applying each pattern word of the pattern dictionary to each pixel of the foreground depth image of the object according to a predefined second similarity criterion;

extracting a feature for each pixel of the foreground depth image of the object by calculating frequencies of pattern words applied to pixels around each pixel of the foreground depth image of the object; and generating the feature set for each part of the foreground depth image of the object by collecting the extracted features of each part of the foreground depth image of the object.

6. The method for tracking a position according to claim 4, wherein the training of the classifier is performed using a randomized forests algorithm.

* * * * *